(12) United States Patent
Sun

(10) Patent No.: US 7,929,290 B2
(45) Date of Patent: Apr. 19, 2011

(54) COMPUTER ENCLOSURE AND I/O INTERFACE APPARATUS

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 50 days.

(21) Appl. No.: 12/489,456

(22) Filed: Jun. 23, 2009

(65) Prior Publication Data

US 2010/0290178 A1    Nov. 18, 2010

(30) Foreign Application Priority Data

May 14, 2009  (CN) .......................... 2009 1 0302309

(51) Int. Cl.
*H05K 5/00* (2006.01)
*H05K 7/00* (2006.01)
(52) U.S. Cl. ........... 361/679.4; 361/679.31; 361/679.32; 361/679.45; 361/679.55; 361/679.6
(58) Field of Classification Search ............. 361/679.31, 361/679.32, 679.4, 679.45, 679.55, 679.6
See application file for complete search history.

(56) References Cited

U.S. PATENT DOCUMENTS

| 5,666,267 A | * | 9/1997 | Carter et al. | ............. 361/679.32 |
| 6,341,060 B1 | * | 1/2002 | Chuang | ..................... 361/679.33 |
| 6,854,174 B2 | * | 2/2005 | Jiang | ............................. 29/603.1 |

* cited by examiner

*Primary Examiner* — Jayprakash N Gandhi
*Assistant Examiner* — Anthony M Haughton
(74) *Attorney, Agent, or Firm* — Raymond J. Chew

(57) ABSTRACT

A computer enclosure includes a main body defining a holding space in an upper end of the main body and an input/output (I/O) interface apparatus. One part of the I/O interface apparatus is inserted into the holding space of the main body and the other part of the I/O interface apparatus is exposed out of the holding space of the main body. A plurality of I/O interfaces is mounted on an upper side of the other part of the I/O interface apparatus.

6 Claims, 5 Drawing Sheets

US 7,929,290 B2

COMPUTER ENCLOSURE AND I/O INTERFACE APPARATUS

BACKGROUND

1. Technical Field

The present disclosure relates to a computer enclosure and an input/output (I/O) interface apparatus thereof.

2. Description of Related Art

A front panel of a computer enclosure may include many I/O interfaces, such a universal serial bus (USB) interface, an earphone interface, a card reader interface, a power push button, a power indicator, a reset push button, and a reset indicator, for example.

Referring to FIG. 1, it is common for computer enclosure to placed on the floor or low shelf out of the way of the work area but near to hand. In this situation, when a user 100 operates I/O interfaces of a front panel 220 of a related-art computer enclosure 200, the user 100 needs to lean over or stoop over to operate these I/O interfaces on the front panel 220, which is very inconvenient.

DETAILED DESCRIPTION

Figure 1:
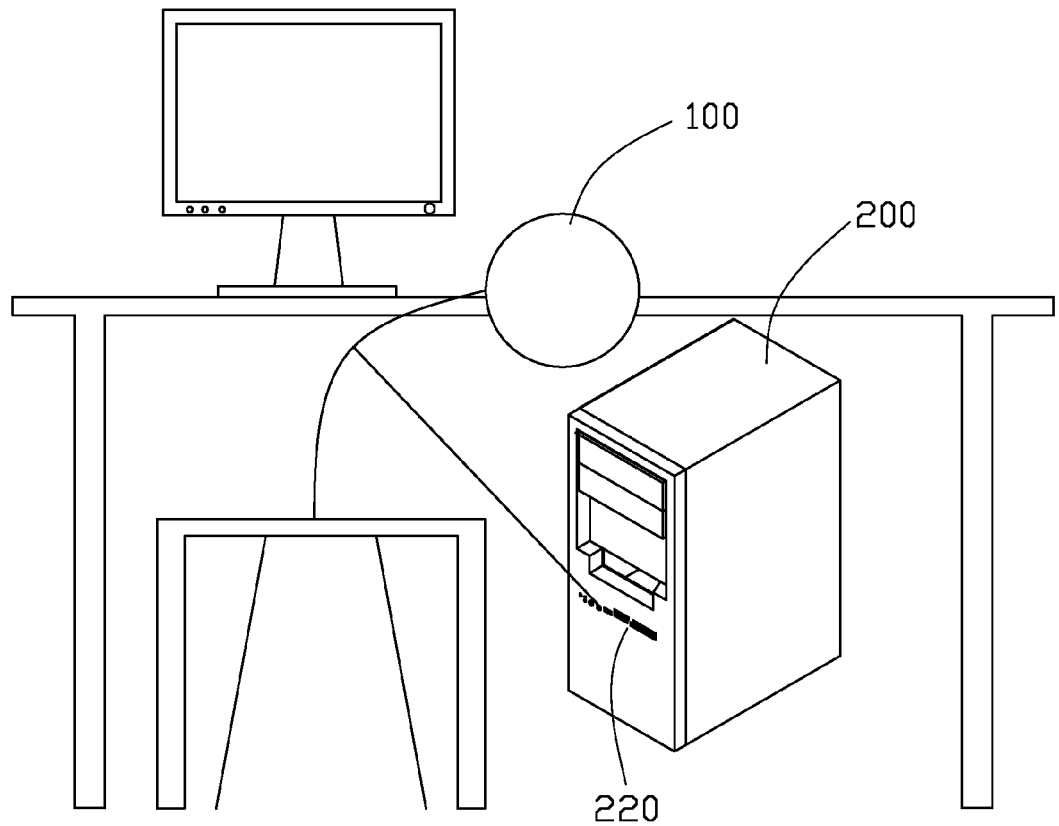
FIG. 1 is an isometric, schematic view of a related-art computer enclosure operated by a user, together with a display.
Figure 2:
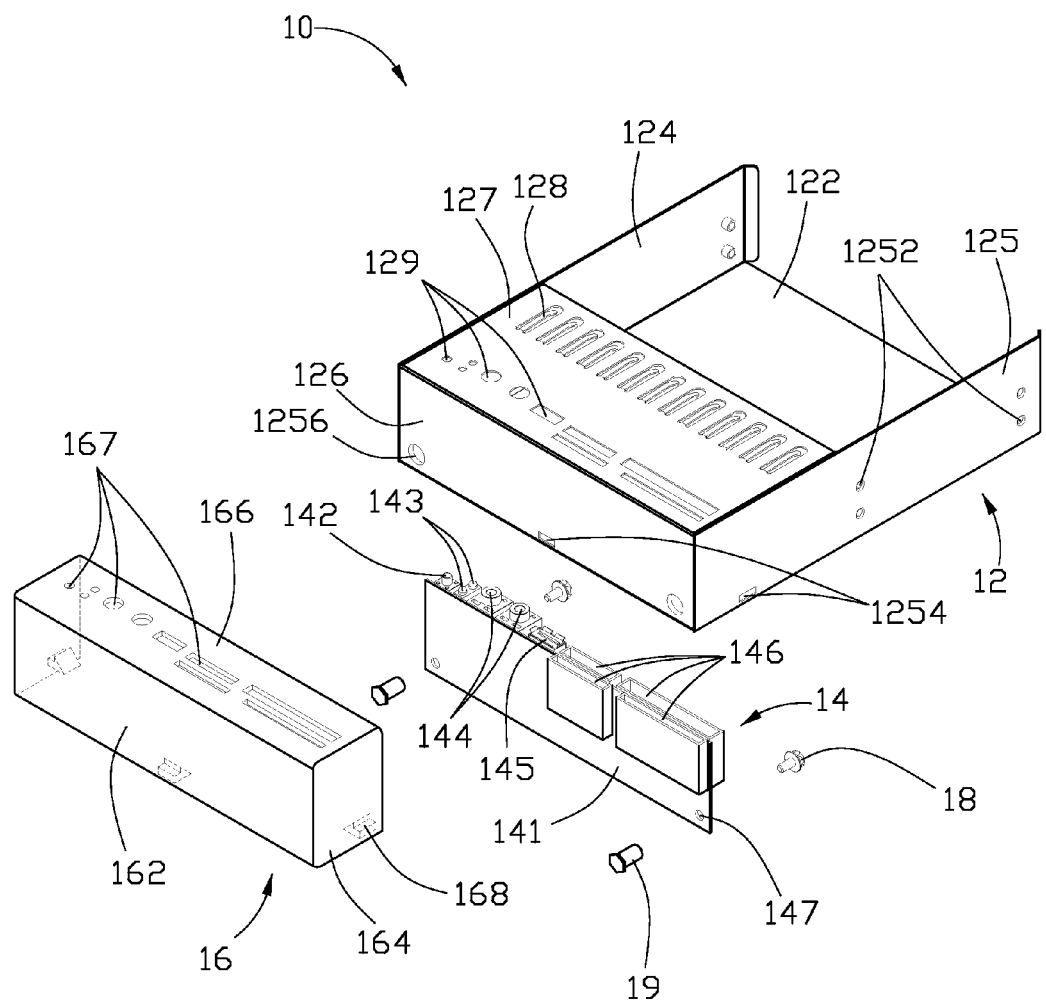
FIG. 2 is an exploded, isometric view of an exemplary embodiment of an I/O interface apparatus.
Figure 3:
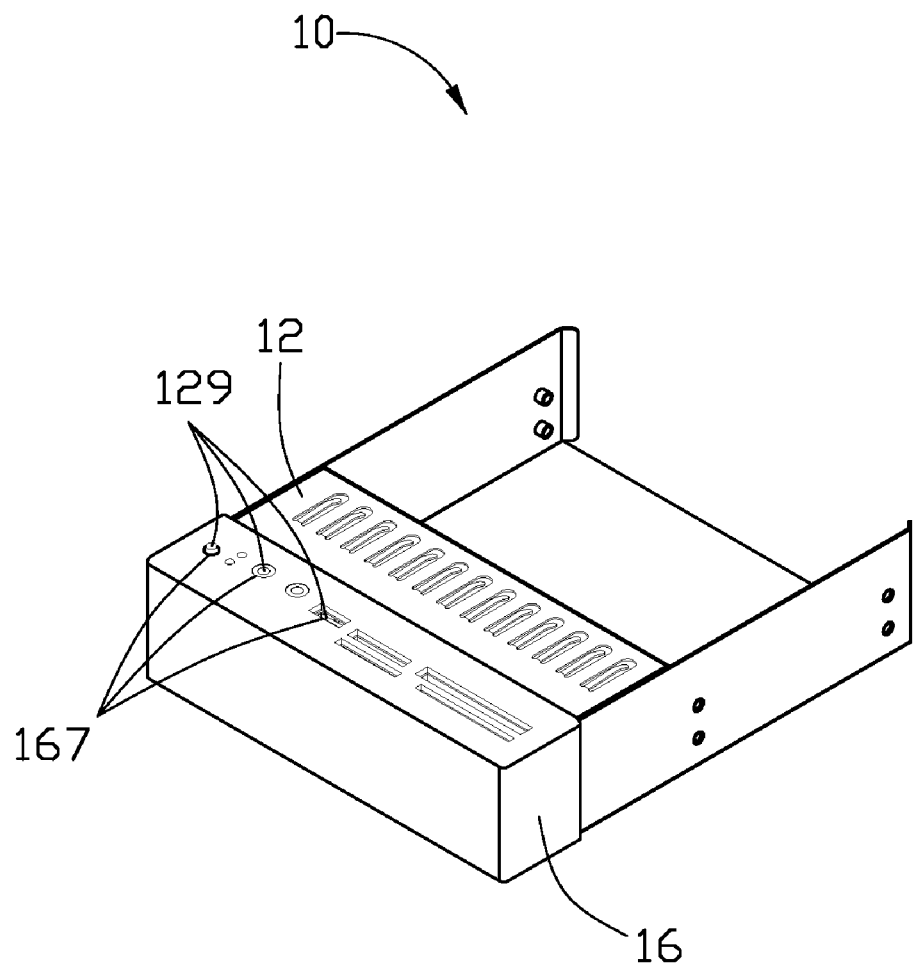
FIG. 3 is an assembled view of FIG. 2.
Figure 4:
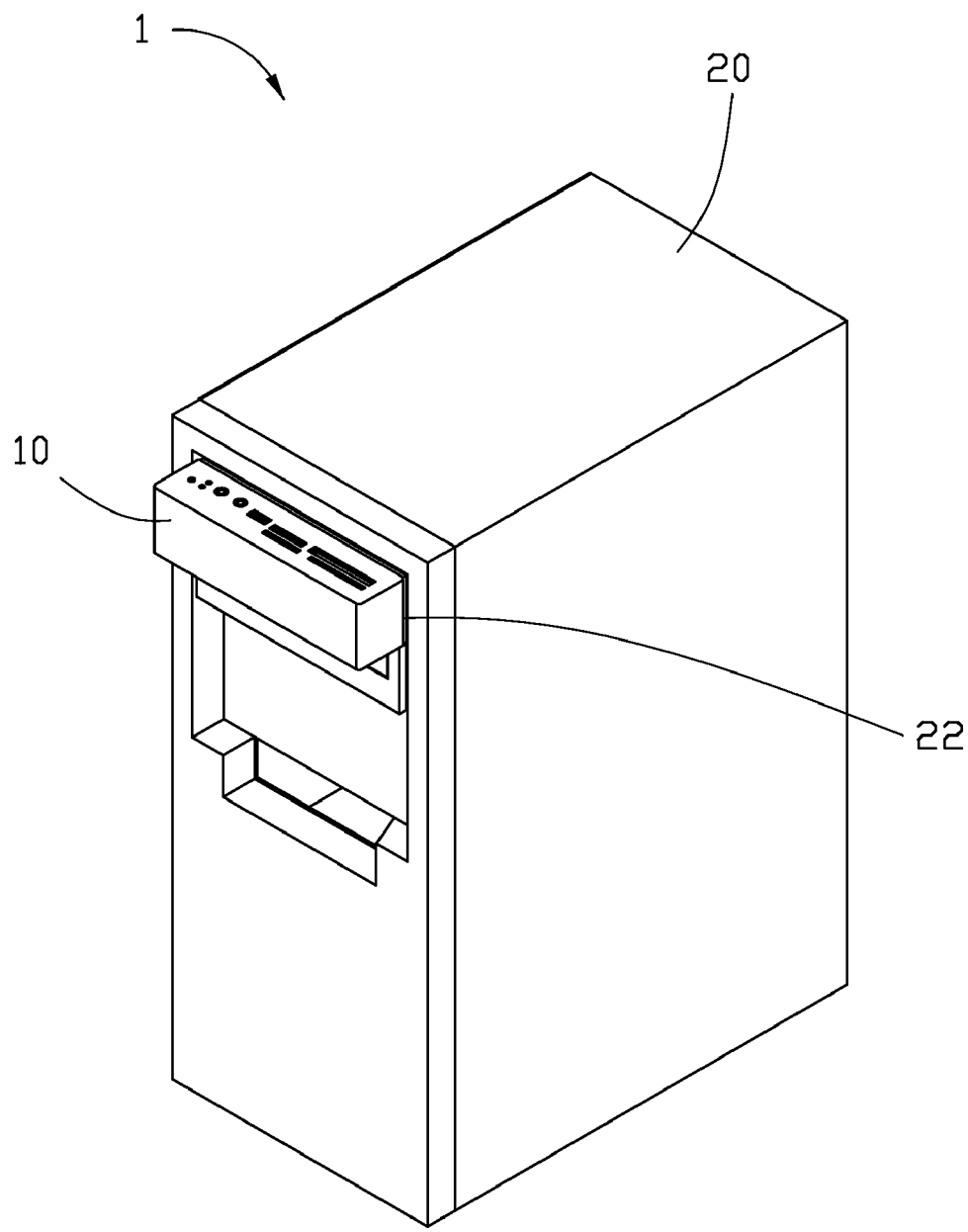
FIG. 4 is an isometric, schematic view of an exemplary embodiment of a computer enclosure.

Referring to FIGS. 2 to 4, an exemplary embodiment of a computer enclosure 1 includes an input/output (I/O) interface apparatus 10 and a main body 20. The main body 20 defines a holding space 22 in an upper end of the main body 20.

The I/O interface apparatus 10 is approximately rectangular-shaped. The interface apparatus 10 includes a mounting element 12, a circuit board 14 having a plurality of I/O interfaces, and a protecting cover 16.

The mounting element 12 includes a rectangular base board 122, two sidewalls 124 and 125 respectively perpendicularly extending from two long edges of the base board 122, and a sidewall 126 perpendicularly extending from a short edge of the base board 122. A shield board 127 is mounted on upper ends of the sidewalls 124, 125 and 126, opposite to the base board 122. A rear end of the shield board 127 defines a plurality of parallel electromagnetic interference (EMI) protecting tabs 128. A plurality of openings 129 is defined in a front end of the shield board 127 corresponding to the I/O interfaces on the circuit board 14. Four holding holes 1252 are defined in each of the sidewalls 124 and 125. Three slots 1254 are respectively defined in a lower end of each of the sidewalls 124, 125, and 126. Two locating holes 1256 are defined in two opposite ends of the sidewall 126.

The circuit board 14 includes a base board 141. The I/O interfaces of the circuit board 14 are mounted on an upper end of the base board 141. The I/O interfaces includes a push button 142, two indicators 143, two audio interfaces 144, a USB interface 145, and four card reader interfaces 146, for example. In one embodiment, the push button 142 is a reset push button to reset a computer motherboard (not shown) in the computer enclosure 1. The two indicators 143 may be a power indicator and a reset indicator. Two through holes 147 are defined in two opposite ends of the base board 141 corresponding to the two locating holes 1256 of the sidewall 126 of the mounting element 12. In other embodiments, the number, the type, and the locations of the I/O interfaces can be changed according to requirements. The I/O interfaces may also include push buttons and indictors, for example. The circuit board 14 also includes interface circuits and interface connectors (not shown) configured to connect to corresponding connectors of the computer motherboard. The interface circuits and interface connectors are known technology, therefore are not described here.

The protecting cover 16 is made of a plastic material and includes a sidewall 162, two end walls 164, and an upper wall 166. The sidewall 162, the end walls 164, and the upper wall 166 cooperatively define a receiving space to receive a front end of the mounting element 12 therein. A plurality of openings 167 is defined in the upper wall 166 corresponding to the openings 129 of the mounting element 12. Three latches 168 are respectively mounted in inner sides of the sidewall 162 and the end walls 164 corresponding to the three slots 1254 of the mounting element 12.

In assembly of the I/O interface apparatus 10, the circuit board 14 is arranged in the mounting element 12, and the push button 142, the indicators 143, the audio interfaces 144, the USB interface 145, and the card reader interfaces 146 are arranged corresponding to the openings 129 of the mounting element 12. Two screws 18 are inserted into the two through holes 147 of the base board 141. Two internally threaded dowels 19 are inserted into the two locating holes 1256 of the mounting element 12. The two screws 18 are screwed into the two dowels 19 to position the circuit board 14 in the mounting element 12. The protecting cover 16 is placed to cover the front end of the mounting element 12. The three latches 168 of the protecting cover 16 engage in the three slots 1254 of the mounting element 12. The push button 142, the indicators 143, the audio interfaces 144, the USB interface 145, and the card reader interfaces 146 are positioned corresponding to the openings 167 of the protecting cover 16. The protecting cover 16 protects the circuit board 14 from EMI.

In assembly of the computer enclosure 1, the assembled I/O interface apparatus 10 is inserted into the holding space 22 of the main body 20, where the protecting cover 16 is exposed out of the holding space 22 of the main body 20. The I/O interface apparatus 10 is fixed in the holding space 22 of the main body 20 via eight screws screwed into the eight holding holes 1252 of the I/O interface apparatus 10. The push button 142, the indicators 143, the audio interfaces 144, the USB interface 145, and the card reader interfaces 146 are arranged upwards. The connectors of the circuit board 14 are connected to the corresponding connectors of the motherboard. When the motherboard receives a power supply, the push button 142, the indicators 143, the audio interfaces 144, the USB interface 145, and the card reader interfaces 146 can be operated by users.

Figure 5:
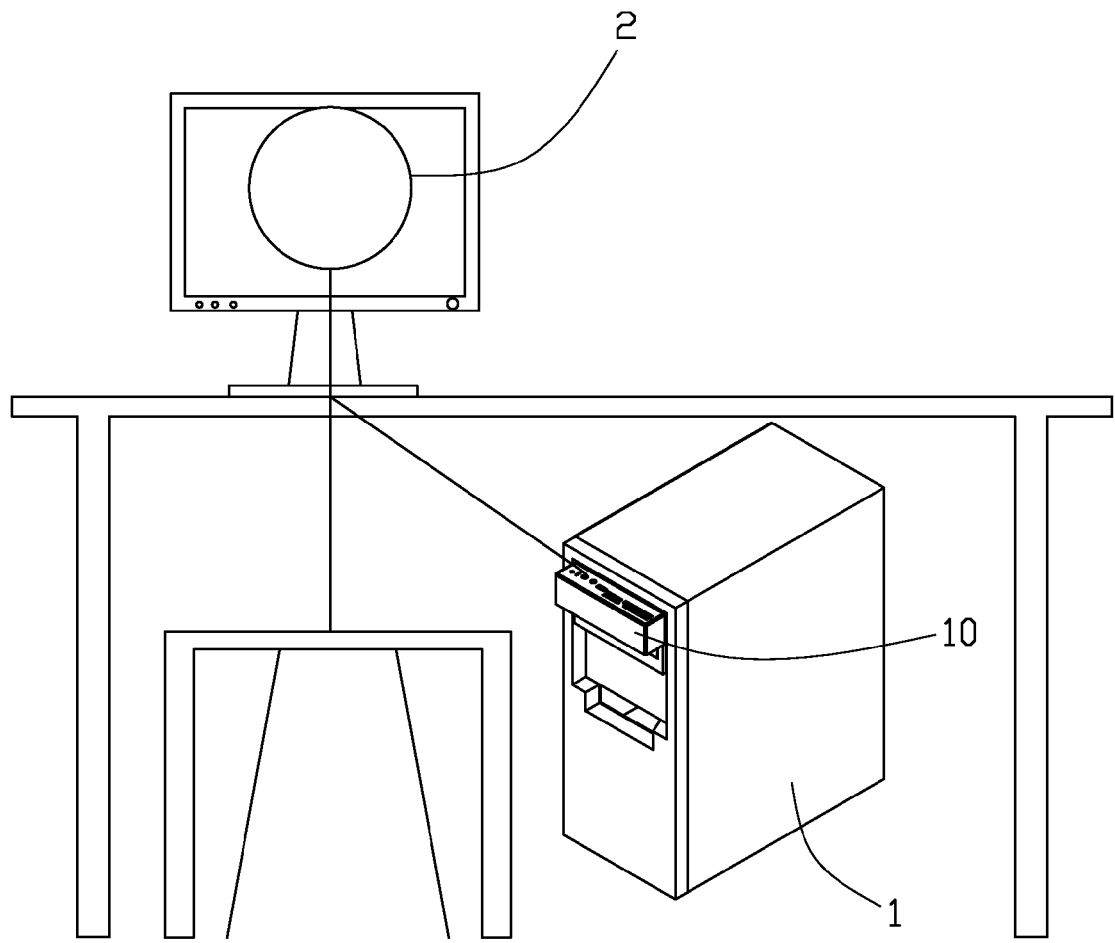
FIG. 5 is an isometric, schematic view of the computer enclosure of FIG. 4 operated by a user, together with a display.

Referring to FIG. 5, when a user 2 operates the I/O interfaces (namely the push button 142, the indicators 143, the audio interfaces 144, the USB interface 145, and the card reader interfaces 146) of the computer enclosure 1, the user 2 may not need to lean over or stoop over to operate the I/O interfaces of the computer enclosure 1, which is very convenient.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer enclosure, comprising:
   a main body defining a holding space in an upper end of the main body;
   an input/output (I/O) interface apparatus, wherein one part of the I/O interface apparatus is inserted into the holding space of the main body and the other part of the I/O interface apparatus is exposed out of the holding space of the main body, and wherein plurality of I/O interfaces are mounted on an upper side of the other part of the I/O interface apparatus; and
   a protecting cover covering the other part of the I/O interface apparatus;
   wherein the I/O interface apparatus comprises a mounting element to be mounted in the holding space of the main body, and wherein a circuit board is mounted on the mounting element to connect to the plurality of I/O interfaces;
   wherein the mounting element comprises a base board, two first sidewalls respectively perpendicularly extending from two long edges of the base board, and a second sidewall perpendicularly extending from a short edge of the base board, a plurality of holding holes is defined in each of the first sidewalls, three slots are respectively defined in a lower end of each of the first and second sidewalls, two locating holes are defined in two opposite ends of the second sidewall;
   wherein a shield board is mounted on the first and second sidewalls, a plurality of openings is defined in a front end of the shield board corresponding to the plurality of I/O interfaces on the circuit board;
   wherein the protecting cover comprises a sidewall, two end walls, and an upper wall, wherein the sidewall, the end walls, and the upper wall cooperatively form a cover to cover a front end of the mounting element; a plurality of openings is defined in the upper wall corresponding to the openings of the shield board, three latches are respectively mounted in inner sides of the sidewall and the end walls corresponding to the three slots of the mounting element.

2. The computer enclosure of claim 1, wherein a rear end of the shield board defines a plurality of parallel electro magnetic interference (EMI) protecting tabs.

3. The computer enclosure of claim 1, wherein the plurality of I/O interfaces comprises at least one of a push button, an indicator, an audio interfaces, an universal serial bus (USB) interface, and a card reader interface.

4. An input/output (I/O) interface apparatus operable to be inserted into a holding space of an upper end of a computer enclosure, the I/O interface apparatus comprising:
   a mounting element to be mounted in the holding space of the computer enclosure;
   a circuit board mounted on the mounting element to connect to a plurality of I/O interfaces, wherein the plurality of I/O interfaces are arranged on an upper side of the circuit board and exposed out of the holding space of the computer enclosure; and
   a protecting cover covering the plurality of I/O interfaces of the I/O interface apparatus;
   wherein the mounting element comprises a base board, two first sidewalls respectively perpendicularly extending from two long edges of the base board, and a second sidewall perpendicularly extending from a short edge of the base board, a plurality of holding holes is defined in each of the first side walls, three slots are respectively defined in a lower end of each of the first and second sidewalls, two locating holes are defined in two opposite ends of the second sidewall;
   wherein a shield board is mounted on the first and second sidewalls, a plurality of openings is defined in a front end of the shield board corresponding to the plurality of I/O interfaces on the circuit board;
   wherein the protecting cover comprises a sidewall, two end walls, and an upper wall, wherein the sidewall, the end walls, and the upper wall cooperatively form a cover to cover a front end of the mounting element, a plurality of openings is defined in the upper wall corresponding to the openings of the shield board, three latches are respectively mounted in inner sides of the sidewall and the end walls corresponding to the three slots of the mounting element.

5. The I/O interface apparatus of claim 4, wherein a rear end of the shield board defines a plurality of parallel electromagnetic interference (EMI) protecting tabs.

6. The I/O interface apparatus of claim 4, wherein the plurality of I/O interfaces comprises at least one of push button, an indicator, an audio interface, a universal serial bus (USB) interface, and a card reader interface.

* * * * *